(12) United States Patent
Wixson et al.

(10) Patent No.: US 12,324,540 B2
(45) Date of Patent: Jun. 10, 2025

(54) METHOD OF USING HIGH TEMPERATURE FILTER FOR EDIBLE COOKING OIL

(71) Applicant: Oil Solutions Group, Inc., Colleyville, TX (US)

(72) Inventors: James R. Wixson, Roswell, GA (US); Howard D. Wixson, Colleyville, TX (US)

(73) Assignee: Oil Solutions Group, Inc., Colleyville, TX (US)

( * ) Notice: Subject to any disclaimer, the term of this patent is extended or adjusted under 35 U.S.C. 154(b) by 597 days.

(21) Appl. No.: 17/584,687

(22) Filed: Jan. 26, 2022

(65) Prior Publication Data

US 2023/0097915 A1    Mar. 30, 2023

Related U.S. Application Data

(60) Provisional application No. 63/250,483, filed on Sep. 30, 2021.

(51) Int. Cl.
| | |
|---|---|
| *A47J 37/12* | (2006.01) |
| *B01D 29/15* | (2006.01) |
| *B01D 29/92* | (2006.01) |
| *B01D 39/16* | (2006.01) |

(52) U.S. Cl.
CPC ......... *A47J 37/1223* (2013.01); *B01D 29/15* (2013.01); *B01D 29/925* (2013.01); *B01D 39/1623* (2013.01); *B01D 2239/0478* (2013.01); *B01D 2239/0618* (2013.01);
(Continued)

(58) Field of Classification Search
CPC ... A47J 37/1223; B01D 29/15; B01D 29/925; B01D 39/1623; B01D 2239/0478; B01D 2239/0618; B01D 2239/1208; B01D 2239/1258; B01D 2239/1291
See application file for complete search history.

(56) References Cited

U.S. PATENT DOCUMENTS

| | | |
|---|---|---|
| 3,363,541 A | 1/1968 | Anetsberger |
| 3,646,882 A | 3/1972 | Keating |
| 4,962,698 A | 10/1990 | Drijftholt et al. |

(Continued)

FOREIGN PATENT DOCUMENTS

| | | |
|---|---|---|
| CN | 106917292 A | 7/2017 |
| CN | 105749623 B | 8/2019 |

(Continued)

OTHER PUBLICATIONS bakeryandsnacks.com; "PPS-Based Paper Filter Targets Dairy Sector." Bakeryandsnacks.com, William Reed Ltd. Jul. 19, 2008, https://www.bakeryandsnacks.com/Article/2004/12/08/PPS-based-paper-filter-targets-dairy-sectot.

(Continued)

*Primary Examiner* — Anthony J Weier
(74) *Attorney, Agent, or Firm* — Wood Herron & Evans LLP

(57) ABSTRACT

A method for filtering particulate down to 0.5 micron from cooking oil at a filtration temperature of up to 425° Fahrenheit is provided. The method includes providing a filter having a non-woven panel of randomly oriented fibers of polyphenylene sulfide (PPS) material and exposing the filter to the oil for a period of time while applying a pressure or vacuum to move the oil through the filter for filtering particulate from the cooking oil.

13 Claims, 7 Drawing Sheets

(52) U.S. Cl.
CPC ................ *B01D 2239/1208* (2013.01); *B01D 2239/1258* (2013.01); *B01D 2239/1291* (2013.01)

(56) References Cited

U.S. PATENT DOCUMENTS

| | | |
|---|---|---|
| 5,404,799 A | 4/1995 | Bivens |
| 5,486,370 A | 1/1996 | Bivens |
| 5,731,024 A | 3/1998 | Bivens |
| 5,979,303 A | 11/1999 | Kobayashi et al. |
| 6,095,037 A | 8/2000 | Savage et al. |
| 6,235,210 B1 | 5/2001 | Saksena |
| 6,482,326 B2 | 11/2002 | Munson et al. |
| 6,844,275 B2 | 1/2005 | Yamamoto et al. |
| 7,677,162 B2 | 3/2010 | Shandross |
| 7,686,952 B2 | 3/2010 | Bivens |
| 8,066,889 B2 | 11/2011 | Bivens et al. |
| 8,651,017 B2 | 2/2014 | Bivens |
| 8,828,223 B2 | 9/2014 | Savage et al. |
| 8,931,403 B2 | 1/2015 | Forrest et al. |
| 9,532,681 B2 | 1/2017 | Savage et al. |
| 10,433,674 B2 | 10/2019 | Savage et al. |
| 10,436,763 B2 | 10/2019 | Behle et al. |
| 11,357,358 B2 | 6/2022 | Savage et al. |
| 2006/0076281 A1 | 4/2006 | Aldeguer |
| 2007/0289927 A1 | 12/2007 | Bivens et al. |
| 2008/0069991 A1 | 3/2008 | Kohli et al. |
| 2015/0240390 A1 | 8/2015 | Yakake et al. |
| 2017/0210643 A1 | 7/2017 | Sato et al. |
| 2019/0055492 A1* | 2/2019 | Takabatake ............. A23L 5/276 |
| 2019/0338200 A1* | 11/2019 | Slade ..................... C11B 3/001 |

FOREIGN PATENT DOCUMENTS

| | | |
|---|---|---|
| KR | 101379098 B1 | 3/2014 |
| KR | 20180005406 A | 1/2018 |
| WO | 2014170883 A1 | 10/2014 |

OTHER PUBLICATIONS

U.S. Patent and Trademark Office; Invitation to Pay Additional Fees in related International Patent Application No. PCT/US2022/44985 dated Dec. 9, 2022; 3 pages.

\* cited by examiner

METHOD OF USING HIGH TEMPERATURE FILTER FOR EDIBLE COOKING OIL

CROSS-REFERENCE TO RELATED APPLICATIONS

This application claims the benefit of priority to U.S. Provisional Patent Application Ser. No. 63/250,483 filed Sep. 30, 2021, the disclosure of which is incorporated by reference herein.

FIELD OF THE INVENTION

This invention relates generally to the filtering of edible cooking oil for fryers and, more particularly, to a high temperature edible oil filter for filtering particulate from edible cooking oils.

BACKGROUND OF THE INVENTION

Fryers are extensively used in the food industry to cook various foods and render them flavorful, colorful, and digestible. One common type of fryer is a deep fat fryer, which includes a heated vessel of edible cooking oil in which food items are placed for cooking. Depending on the application, deep fat fryers are sized to contain anywhere between one to thousands of gallons of heated cooking oil. Food products are cooked by being immersed in the cooking oil for a period of time before being removed. The cooking oil is typically heated in the vessel to a temperature between about 250° Fahrenheit (F) and about 375° F. (about 121° C. and about 190° C.), and in many cases the cooking oil is heated to temperatures as high as 425° F.

Over time, as food items are continually introduced into the fryer and cooked, the cooking oil breaks down and becomes contaminated with particulate such as suspended food particles. More particularly, starches and proteins break down the cooking oil through chemical reaction with oxidation, polymerization, hydration, and other similar compounds that are catalysts in the degradation process of the cooking oil. One example of a contributor to the alteration and degradation of the cooking oil is food particles that become dislodged from food during the cooking process and thereafter remain in the oil as particulate. Water and fats that are extracted from the food during the cooking process and remain in the oil, and any other contaminants such as free fatty acids, are other examples of possible contaminants that may alter the cooking characteristics of the cooking oil.

In addition to degrading the cooking oil, contaminants such as those mentioned above, if not removed from the cooking oil, will eventually become charred and will impart unwanted tastes, odors, and dark color to the oil. Furthermore, such contaminants may attach themselves to food products during the frying process, thereby raising the potential for adversely affecting the taste of the food products and/or creating negative health issues upon consumption. Thus, it is necessary to filter out and remove these contaminants from the cooking oil to extend the useful life of the cooking oil. In that regard, conventional filtration devices generally operate by draining the cooking oil from the fryer into a filtration container and then cycle the cooking oil through a filter. Oftentimes, when the filtration operation is begun, the cooking oil is at or near cooking temperature (e.g., between about 250° F. and about 425° F.), and batch filtration continues until a subjective determination is made that the filtering process has achieved a desired result.

For filters used with such cooking oil filtration devices, particulate separation is a core attribute. In this regard, the efficiency of a particular filter material is measured by the size of particulate material that it can retain, the overall amount of particulate that can be retained, and the volume of filtrate that can flow through the filter in a given period of time at the operating pressure of the filtration device. The standard filter type for oil filtration in the foodservice industry is either a nonwoven cellulose, rayon flat sheet or sewn envelope, thick cellulose pad, or a woven stainless-steel mesh. Each of these filter types has different particulate removal characteristics, capabilities, and drawbacks, as discussed in turn below.

Paper and rayon filter media range in filtering capabilities of between 10 and 190 microns. They are typically thin and cannot be scraped once blinded with particulate, requiring the filters to be replaced at least daily and often multiple times a day. They also absorb many times (15 to 20 times) the dry filter weight in oil during filtering that is then discarded each time the filter is replaced.

Cellulose pads have smaller particulate sieving capabilities, filtering down to between 1 and 10 microns. However, they are considerably more dense than paper media and produce significant resistance on the pump and motor as a result of the reduced flowability of the cooking oil through the filter. Although cellulose pads last longer compared to paper filters they absorb considerably more oil compared to paper filters during filtering, resulting in a substantial amount of oil being discarded each time the filter is replaced. The amount of oil discarded is as much as 20 to 30 times the dry weight of the filter without oil saturation.

Stainless steel filters sieve particulate as small as 60 to 120 micron or require expensive powders/filter aids to form a filter cake to be able to filter particulate as small as 20 micron. While reusable, these filters are laborious to maintain, requiring disassembly, cleaning, drying time, reassembly time, and stainless steel filters are expensive to replace.

A more recent entrant into the filter media market is a reusable non-woven polyester filter. The polyester material includes interstitial openings between the fibers that provides these types of filters with an inherent built-in depth filtration. However, synthetic material such as non-woven polyester does not tolerate heat exposure to oil temperatures greater than 300° F. for long durations. After a short period of exposure to high temperature cooking oil, the filter material softens and the interstitial openings within the filter collapse rendering it blind. A blinded filter reduces the volume of filtrate that can flow through the filter and inhibits the ability of the filter to remove particulate from the oil. One example of a reusable non-woven polyester filter is disclosed in U.S. Pat. No. 8,066,889.

In view of the above, there is an increasing need to have a reusable filter that can withstand exposure to high temperature cooking oil for extended periods of time, and particularly cooking oil having a filtration temperature of up to 425° F., while being capable of filtering particulate down to 0.5 micron. It is further desirable to have a filter with the above characteristics that absorbs considerably less oil compared to conventional filters on the market.

SUMMARY OF THE INVENTION

The accompanying drawings, which are incorporated in and constitute part of this specification, illustrate embodiments of the invention and, together with the summary of the invention given above, and the detailed description of the drawings given below, explain the principles of the present invention. These illustrations are not to construe the extent to which this filter can be integrated with filter equipment. This invention can be in any configuration where it is in the flow path of any oil being filtered and in communication with a positive displacement vacuum or positive pressure pump, for example.

According to one aspect of the present invention, a method of filtering edible cooking oil at a filtration temperature of up to 425° F. is provided. The method comprises providing an envelope-shaped filter comprising at least one non-woven panel of randomly oriented fibers of polyphenylene sulfide material. The method further comprises inserting a separator screen into a pocket of the envelope-shaped filter, the separator screen having a threaded port configured to couple with a cooking oil suction line of a filter machine. The method further comprises exposing the filter to the cooking oil for up to four hours with the cooking oil at approximately 425° F. while applying a pressure or vacuum to move the cooking oil through the filter for filtering particulate from the cooking oil. Alternatively, the method comprises exposing the filter to the cooking oil for up to two hundred and forty hours with the cooking oil at temperatures below 375° F. while applying a pressure or vacuum to move the cooking oil through the filter for filtering particulate from the cooking oil.

With the cooking oil at any temperature below 375° F., the filter is able to filter particles 0.5 microns and larger for a period of time up to 30 days, assuming the filter is working 8 hours per day. For optimum performance, the applicant recommends the filter of the present invention be changed weekly due to particle deposits within the interstitial openings between the fibers of the filter, as described in more detail below. In the event the cooking oil raises to a temperature up to 425° F., the filter is able to filter particles 0.5 microns and larger for a period of time up to four hours. When compared to a paper filter which is discarded daily with oil impregnated therein, the filter of the present invention may last at least a week at temperatures below 375° F., thereby reducing the quantity of oil discarded in used filters. This discarded oil is known in the industry as oil soak.

According to another aspect of the present invention, a filter for use with a portable or built-in filter machine for filtering cooking oil used in a frying process at a filtration temperature of up to 425° F. is provided. The filter machine has a container configured to receive a quantity of cooking oil from a fryer for filtering. A filter assembly is positioned in the container for filtering particulate from the cooking oil. The filter assembly has a separator screen for supporting the filter. The filter machine has a return line coupled to the container and a pump configured to pump filtered cooking oil from the container to the fryer. The filter comprises at least one non-woven panel of polyphenylene sulfide material. Each non-woven panel of polyphenylene sulfide material comprises randomly oriented fibers having interstitial openings therebetween. The interstitial openings between the fibers are in a range of between 0.5 and 60 microns. The porosity of the filter, measured in cubic feet per minute (CFM), otherwise known as flow rate, is determined by the size of these interstitial openings as well as the thickness of the filter. The thickness of the filter is typically between one and two millimeters. The thicker the filter, the lower the CFM which may pass through the filter, assuming the same size interstitial openings in the filter.

According to another aspect of the present invention, a filter assembly for use with a portable or built-in filter machine for filtering cooking oil used in a frying process at a filtration temperature of up to 425° F. is provided. The filter assembly comprises at least one non-woven panel of polyphenylene sulfide material. Each of the non-woven panels of polyphenylene sulfide material comprises randomly oriented fibers having interstitial openings therebetween. The interstitial openings between the fibers of the filter remain open and unaffected from exposure to cooking oil such that the filter is capable of removing 0.5 micron and larger sized particulate from oil at a filtration temperature of up to 425° F.

DETAILED DESCRIPTION OF THE INVENTION

Figure 1:
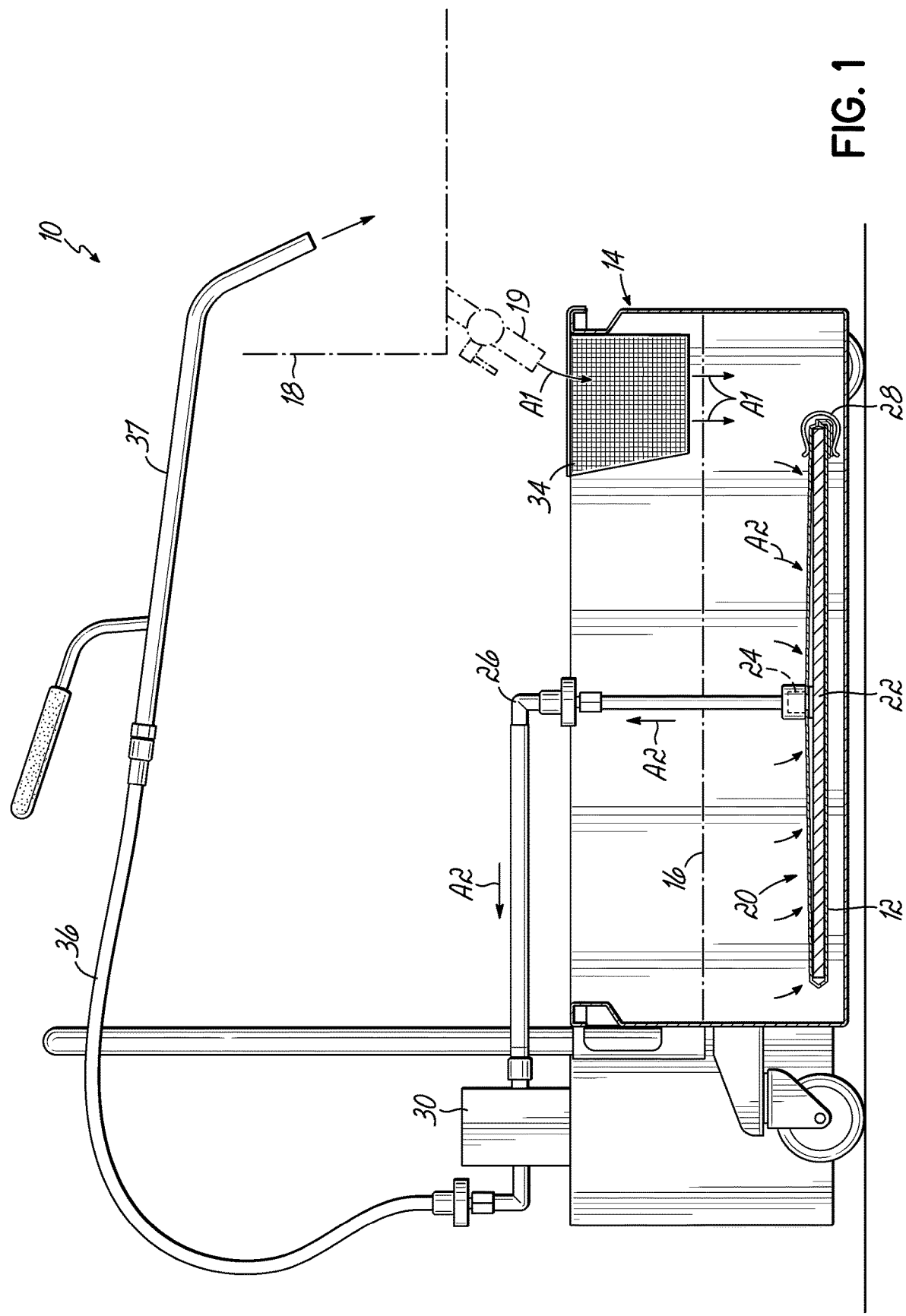
FIG. 1 is a side view, in partial cross section, of a filter machine for filtering edible oil equipped with an envelope filter according to an embodiment of the invention.

Aspects of the present invention are directed to a filter for use with any configuration of a filtration system for filtering edible cooking oil used in a frying process. A typical frying process may involve using a deep fat fryer to cook food items in heated edible cooking oil, as set forth above. With reference to FIG. 1, details of an exemplary filter machine 10 for filtering edible cooking oil are shown in which a filter 12 according to one embodiment of the present invention has particular utility. The exemplary filter machine 10 may be a portable filter machine such as the Armadillo® portable filter machine (owned by the Assignee of the present disclosure). Alternatively, any other portable or built-in filter machine that is available in the foodservice marketplace may be used. However, while the filter 12 is shown and described in the context of a portable filter machine 10, it will be understood that the same inventive concepts related to the filter 12 may be implemented with different oils and different cooking oil filtering machines and systems without departing from the scope of the invention. More particularly, in its broader aspects, the inventive concepts related to the filter 12 may be implemented in a filter for use with any type of cooking oil filtering system that filters particulate of a certain size under vacuum or positive pressure from edible cooking oil. To this end, the drawings are not intended to be limiting.

Figure 2:
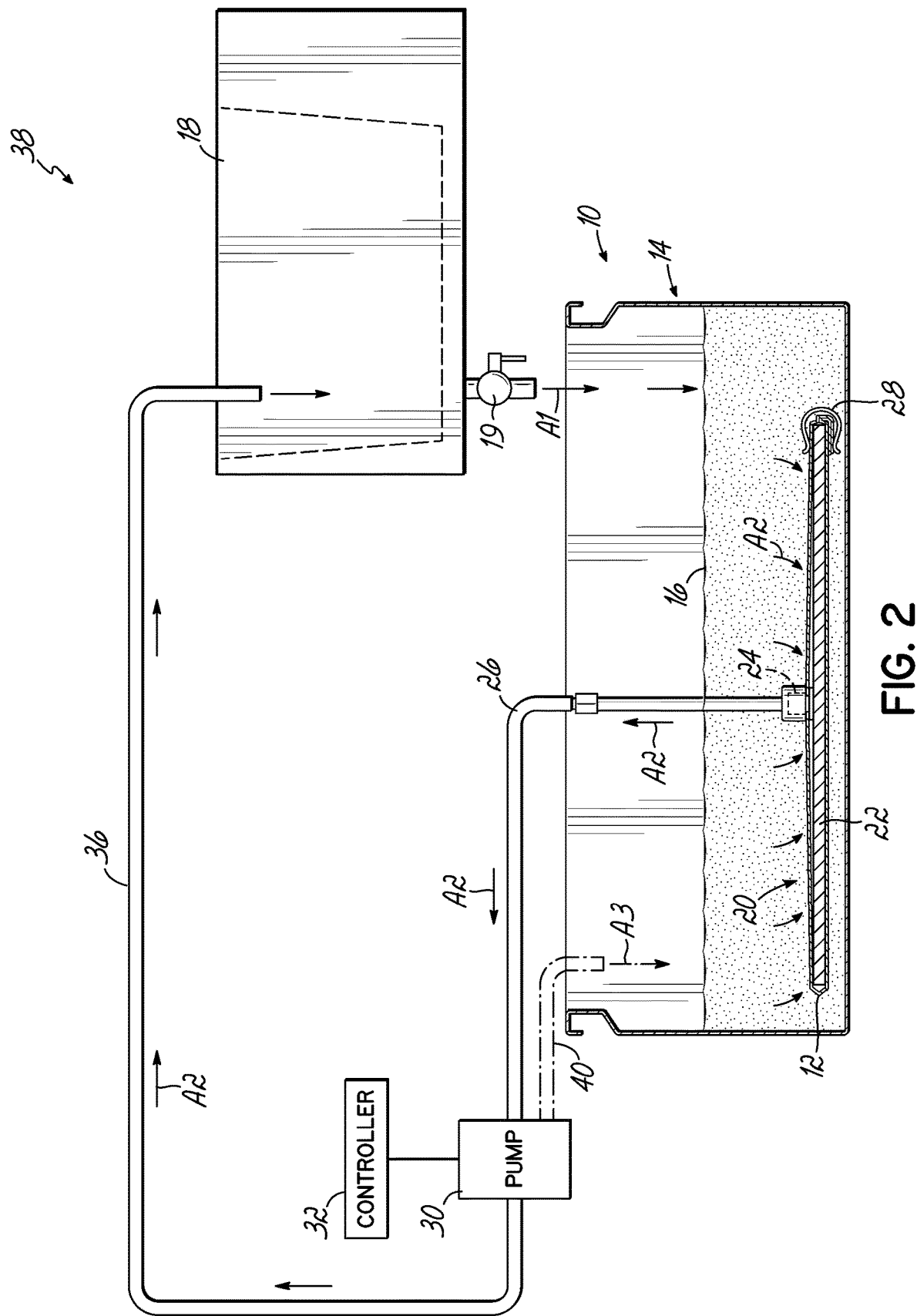
FIG. 2 is a schematic illustration of an edible oil filtration system with the filter machine and filter of FIG. 1, illustrating a filtration process using the filter to filter particulate from the edible cooking oil.

With reference to FIGS. 1 and 2, details of the exemplary filter machine 10 for filtering edible cooking oil demonstrating the flow path of the edible cooking oil from a frying process are shown. In this regard, certain structural and operational features of the filter machine 10 are set forth in detail below to clarify the advantages and other benefits of the filter 12 according to embodiments of the invention. As shown, the filter machine 10 includes a wheeled container 14 configured to receive a quantity of edible cooking oil 16 from a fryer 18. The fryer has a valved drain 19 which directs the edible cooking oil 16 from the fryer 18 into the container 14 as shown in FIGS. 1 and 2. The container 14 may be removable from the filter machine 10 for cleaning, and the top of the container 14 is open (or may include a removable lid) such that oil 16 from the fryer 18 may be drained into the container 14 for filtering, as illustrated by directional arrows A1. The filter machine 10 further includes a filter assembly 20 configured to support the filter 12 in an expanded position in the container 14 for filtering particulate of a certain size from the cooking oil 16 as the cooking oil 16 is drawn through the filter 12 using the filter machine 10, as described in additional detail below. More particularly, the filter 12 is capable of tolerating and being in extended contact with cooking oil 16 at a filtration temperature of up to 425° Fahrenheit (F) while filtering particulate as small as 0.5 micron from the cooking oil 16 as a result of the filter media from which the filter 12 is constructed.

According to an embodiment of the invention, illustrated in FIGS. 1 through 6, the filter 12 is envelope-shaped and is formed from one or more panels of non-woven polyphenylene sulfide (PPS) material. The PPS material from which the filter 12 is formed may be manufactured by Toray Industries, Inc. (Toray International America, Inc.) under the name TORCON™, which is approved for food contact according to the limitations described in Food Contact Substance Notification (FCN) 1180 issued by the Food and Drug Administration. In any event, the PPS material from which the filter 12 is made is capable of filtering particulate down to 0.5 micron from cooking oil 16 having a filtration temperature of up to 425° F. Further, the PPS material can withstand exposure to high temperatures for an extended period of time without degradation to the non-woven microfiber structures that form the panel of PPS material for use as the filter 12. More particularly, the interstitial openings between the PPS micro-fibers remain open and unaffected by the heat from extended contact with cooking oil 16 having temperatures up to 425° F. Thus, the filter 12 is capable of maintaining its 0.5 micron particulate separation rating (e.g., the size of particulate that the filter 12 can retain) as well as its separation efficiency (e.g., the overall amount of particulate that can be retained by the filter 12 and the volume of filtrate that can flow through the filter 12 in a given period of time at the operating vacuum or positive pressure of the filter machine 10) at oil filtration temperatures of up to 425° F., for reasons described more fully below.

While the filter 12 is described herein in the context of PPS material, it will be understood that the filter 12 may be formed of other similar types of material comprising high performance semi-crystalline fibers, such as nylon or Nomex®, for example.

With continued reference to FIGS. 1 and 2, the filter assembly 20 is configured to immerse the filter 12 in the cooking oil 16 for filtering purposes. In this regard, the filter assembly 20 includes a separator screen 22 (which may otherwise be referred to as a support screen, support plate, or separator plate) configured to be received within the filter 12 to thereby maintain positioning of the filter 12 in the container 14. More particularly, the separator screen 22 is configured to support the filter 12 in an expanded state to expose as much surface area of the filter 12 to the cooking oil 16 for filtering particulate therefrom. The separator screen 22 further includes a threaded port 24 configured to couple with a cooking oil suction line 26 of the filter machine 10 for routing filtered oil 16 through motor pump 30 then back to the fryer 18 by way of return line 36 and wand 37. The engagement between the separator screen 22 and the cooking oil suction line 26 maintains positioning of the filter assembly 20 in the container 14, as shown. The filter assembly 20 further includes a retention clip 28, such as a spring clip, configured to retain and seal the separator screen 22 within the filter 12, as described in additional detail below.

To filter particulate from the cooking oil 16, the filter machine 10 further includes a pump 30, such as a hygienic dynamic or positive displacement pump, for example. The pump 30 is operatively coupled to the suction line 26 and configured to apply a vacuum to draw cooking oil 16 located in the container 14 through the filter assembly 20 for filtering, and further pump the filtered oil 16 back to the fryer 18 via the suction line 26, as shown by directional arrows A2. Thus, it may be said that the filter machine 10 operates by a vacuum filtration process. As shown, the filter machine 10 further includes a controller 32 (shown schematically in FIG. 2) configured to operate and control operational parameters of the filter machine 10, such as pump 30 speed and flow rate of the cooking oil 16 through the filter machine 10, for example. Cooking oil may also be filtered through this invention by means of positive pressure as in a plate and frame filter unit. As shown in FIG. 1, the filter machine 10 may include various other components known in the art, such as a screen crumb basket 34, a return line 36, and a wand 37 for directing the flow of filtered oil 16 back into the fryer 18.

With reference to FIG. 2, an exemplary oil filtration circuit 38 is shown schematically in which the filter machine 10 equipped with the filter 12 according to an embodiment of the invention is used to filter particulate from cooking oil 16. As shown, the container 14 of the filter machine 10 is positioned to receive cooking oil 16 from the fryer 18 (via a drain or hard connection), as indicated by directional arrows A1. Typically, the cooking oil 16 is at or near cooking temperature, generally between about 250° F. and about 350° F. (about 121° Celsius and about 171° Celsius), when it is drained into the container 14 of filter machine 10 for filtering. The cooking oil 16 received in the container 14 by way of a directional flow valve is then drawn through the filter 12 using the pump 30 and recirculated back to the fryer 18 through the suction line 26, as shown by directional arrows A2. As shown in FIG. 2, the filter machine 10 may be configured to recirculate the filtered cooking oil 16 back to the container 14 for additional filtering by directing the filtered oil 16 through a recirculation line 40 connected to the container 14 (by way of a directional flow valve), as shown by directional arrow A3. Alternatively, the filtered cooking oil 16 may be routed to the fryer 18 via the suction line 26 and drained back into the container 14 of the filter machine 10 for additional filtering as required to remove all desired particulate from the cooking oil 16, although good results may be usually obtained in a single pass through the filter 12.

Figure 3:
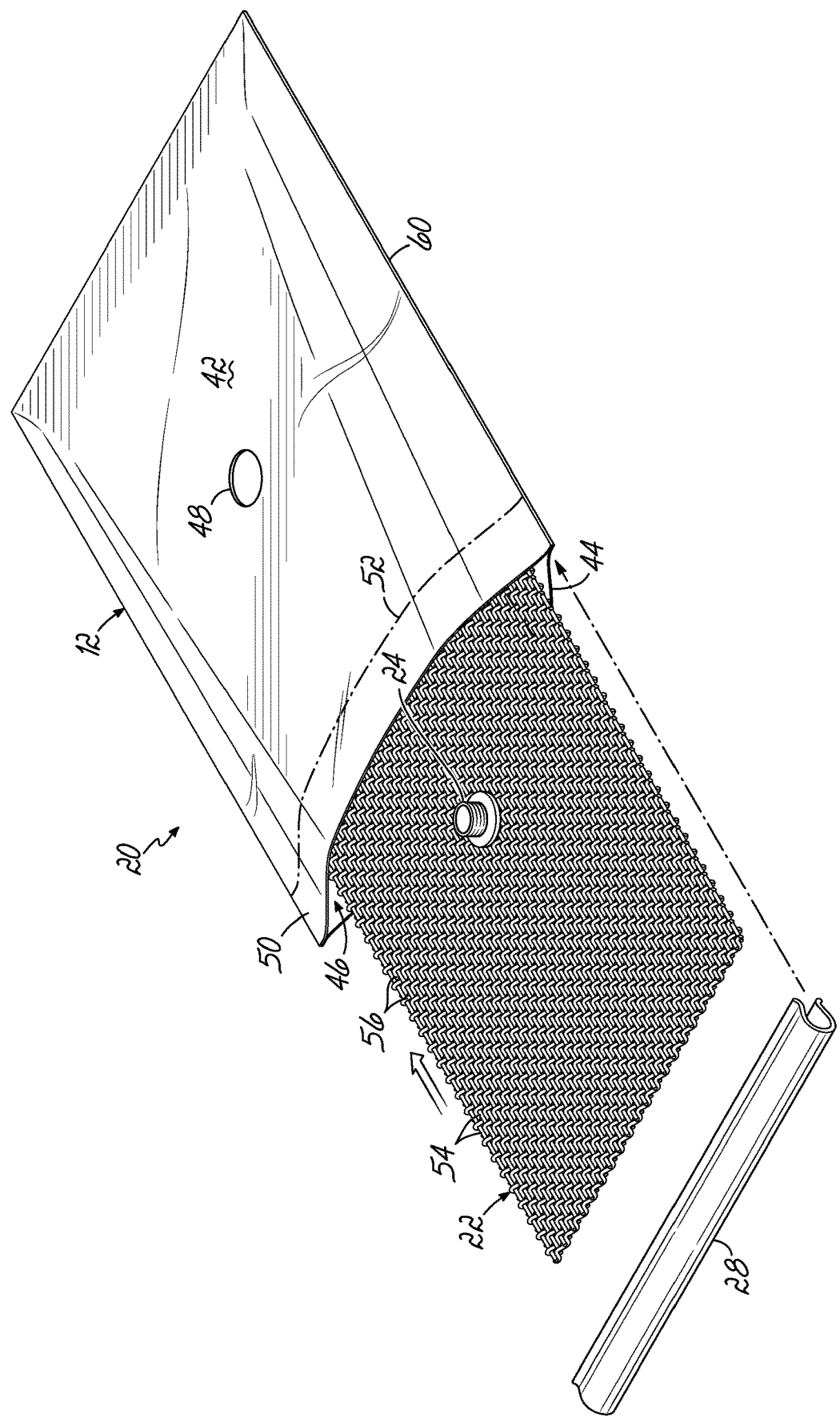
FIG. 3 is a perspective view illustrating assembly of the filter using an insert separator screen within an envelope style filter according to an embodiment of the invention.
Figure 4:
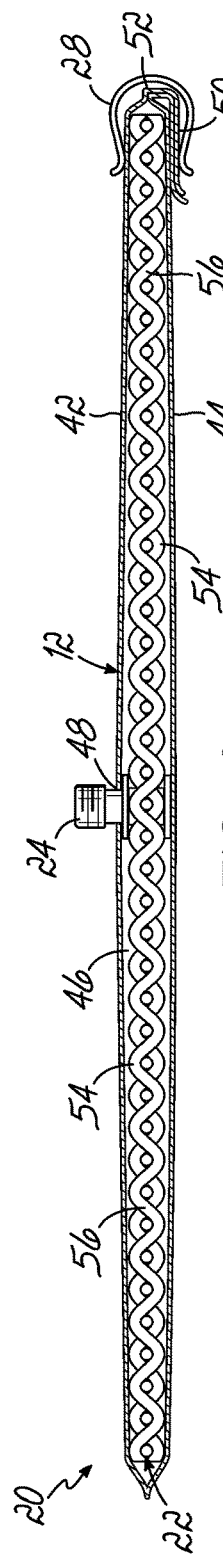
FIG. 4 is a cross-sectional view of the filter and insert separator screen of FIG. 3, illustrating those components assembled.

Turning now with reference to FIGS. 3 and 4, details of the filter assembly 20 are shown. The filter 12 of the embodiment shown may be made of one or more non-woven panels of PPS material folded or joined to form an envelope shape. The envelope-shaped filer 12 has an upper portion 42 attached to a lower portion 44 to form a pocket 46 configured to receive the separator screen 22 therein. The upper and lower portions 42, 44, of envelope-shaped filter 12 may comprise separate panels or one panel of non-woven PPS material, as will be described in additional detail below. As shown, the upper portion 42 of envelope-shaped filter 12 further includes a centrally located aperture 48 configured to receive the threaded port 24 of the separator screen 22 therethrough when the separator screen 22 is positioned within the pocket 46 of the envelope-shaped filter 12, as show in FIG. 4. As best shown in FIG. 1, the filter 12 surrounds the separator screen 22 except for the aperture 48 formed in the filter 12 through which the threaded port 24 of the separator screen 22 extends.

The upper portion 42 of envelope-shaped filter 12 further includes a tab 50 configured to be folded along a fold line 52 and abut the lower portion 44 of the envelope-shaped filter 12 to retain the separator screen 22 in the pocket 46 of the filter 12. As shown in FIG. 4, once the separator screen 22 is positioned within the pocket 46 of the filter 12, the tab 50 is folded over along the fold line 52 to an abutting position with either the upper or lower portions 42, 44 of the filter 12. The retention clip 28 is then secured over the tab 50 and one end of the separator screen 22 to seal the separator screen 22 within the pocket 46 and closed with retention clip 28. When so positioned, the filter assembly 20 is ready for filtering operations as described above. In some applications, the tab 50 of the upper portion 42 of the filter 12 may be secured to the lower portion 44 of the filter 12 omitting the requirement for a retention clip 50. Alternatively, the tab may be formed in the lower portion 44 of the filter 12 and secured to the upper portion 42 of the filter 12 or secured in place with the use of a retention clip 50.

As shown in FIGS. 3 and 4, the separator screen 22 may be formed of an array of interwoven tubular metal extrusions 54, such as stainless steel or aluminum extrusions, for example. The metal extrusions 54 are interwoven to form a grid having predetermined openings 56 between each of the interwoven tubular extrusions 54, or any other method such as a perforated plate to allow filtered oil to freely pass. In this regard, once the oil 16 is drawn through the filter 12 so as to be located in the pocket 46 of the filter 12, the filtered oil 16 may progress through the openings 56 in the separator screen 22 in a direction towards the threaded port 24 where the filtered oil 16 is drawn out and returned to the fryer 18 via the pump 30.

Figure 5:
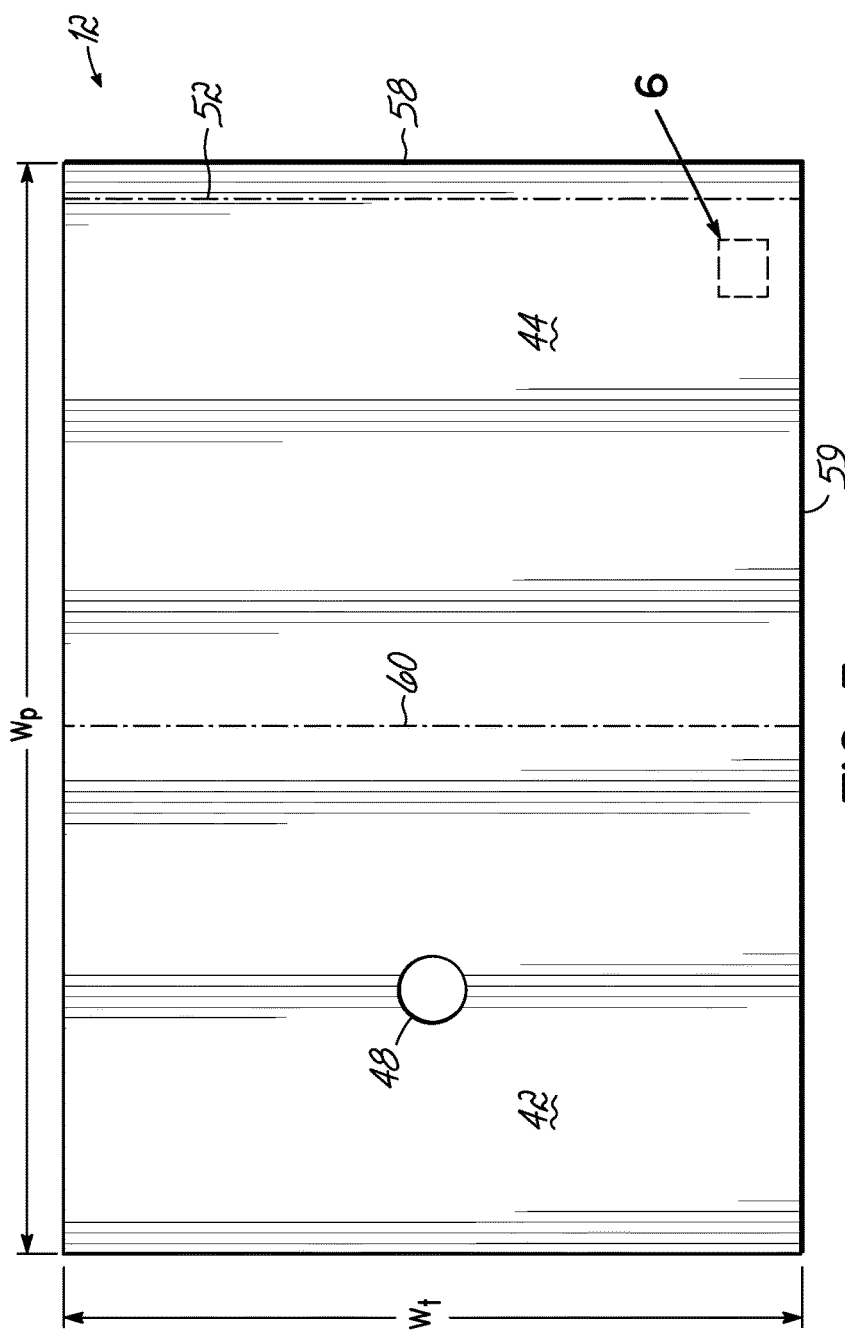
FIG. 5 is top view of a non-woven panel of polyphenylene sulfide (PPS) material that is used to form the filter.

With reference to FIG. 5 and as described above, the envelope-shaped filter 12 may be formed from a single non-woven panel of PPS material 58 (e.g., a blank of PPS material) folded along fold lines 52 and 60 to form the envelope-shaped filter 12. An end edge 59 of the non-woven panel 58 may be joined to itself by welding, bonding or sewing or any other known method to close the envelope-shaped filter 12 after it has been folded. Although not shown other methods of forming the envelope-shaped filter 12 may be used including steps of folding and securing the non-woven panel of PPS material 58 to itself.

The panel of PPS material 58 may be constructed using known manufacturing methods, particularly those used in the textile industry. One such exemplary method includes depositing PPS micro-fibers in successive layers onto a floor apron to form a mat. The mat containing successive layers of deposited, randomly oriented PPS fibers, is then fed through a mat condenser and needle-punched using a conventional needle-punch apparatus. Needle-punching of the PPS fibers entangles the randomly oriented fibers to form a semi-condensed structure. The needle-punched mat is then fed into a treatment apparatus where it is pressed, using a press or rollers, into a felt to form a coherent condensed structure. The felt may have a density within the range of 5 to 24 ounces per square yard of surface area, for example. Preferably, during this process the felt is also heat-glazed using a heated press or calendared with hot roller glaze to form the PPS fabric, being the end product from which the filter 12 is formed. The press or rolls may be heated to within the range of 225° F. to 450° F. depending on the application and desired glaze. To this end, one or both sides of the felt may be glazed. While glazing does not improve filtration of the filter 12, it aids in the removal of the filter cake and also assists in preshrinking of the PPS fabric that forms the filter 12. Preshrinking of the PPS fabric in this regard reduces the amount that the filter 12 shrinks when exposed to the hot cooking oil, as explained in additional detail below. Heat glazing or calendaring the filter material also aids in filter cake release. It is understood that glazing may be carried out in a subsequent process, or by any of various methods known to those having ordinary skill in the art to which the invention relates. The PPS fabric that is formed via the exemplary manufacturing process described above is the end product from which the panel of PPS material 58 may be cut from to form the filter 12.

The manufacturing process described above may be used to manufacture a roll of PPS fabric from which one or multiple panels of filter material 58 may be cut. Each panel of filter material 58 may be die cut, laser cut, slit, or cut with a fabric knife, for example. Once cut to size, the aperture 48 may then be formed to desired diameter in the panel of material 58 using a suitable method, such as die cut, punch, hand cut, or laser cut, for example. According to one embodiment, the end product of the exemplary manufacturing method described above is the non-woven panel of PPS filter material 58 shown in FIG. 5. However, it is understood that a non-woven panel of PPS material 58 can be cut to fit any filter machine available in the market.

With continued reference to FIG. 5, the non-woven panel of PPS material 58 includes a warp dimension $W_p$ (i.e., a length) and a weft dimension $W_t$ (i.e., a width) which may correspond to a desired size of the panel of PPS material 58 cut from the roll of PPS fabric, for example. As shown, the warp dimension $W_p$ may be greater than the weft dimension $W_t$ to form the envelope-shaped filter 12, for example. The panel of PPS material 58 further includes a centrally located fold line 60 that defines the upper and lower portions 42, 44 of the filter 12, as previously described. In this regard, to form the envelope-shaped filter 12, the upper and lower portions 42, 44 of the panel of PPS material 58 are folded together along the fold line 60. The fold line 60 may be located such that the panel of PPS material 58 is folded in half, for example. Once folded, the upper and lower portions 42, 44 may be sewn or ultrasonic welded together (or otherwise attached to one another) along two edges thereof to form the pocket 46 of the envelope-shaped filter 12.

The size of the panel of PPS material 58 may be sized to accommodate a certain amount of shrinkage along the weft dimension $W_t$ and the warp dimension $W_p$ from exposure to the heated cooking oil 16. The PPS material typically experiences little to no shrinkage from heat exposure, however, the cut to fit size of the panel of PPS material 58 accommodates weft $W_t$ and warp $W_p$ shrinkage of up to 1.5%. Other fabric oil filters, such as polyester for example, experience 3% to 5% shrinkage in the weft and warp dimensions.

Figure 6:
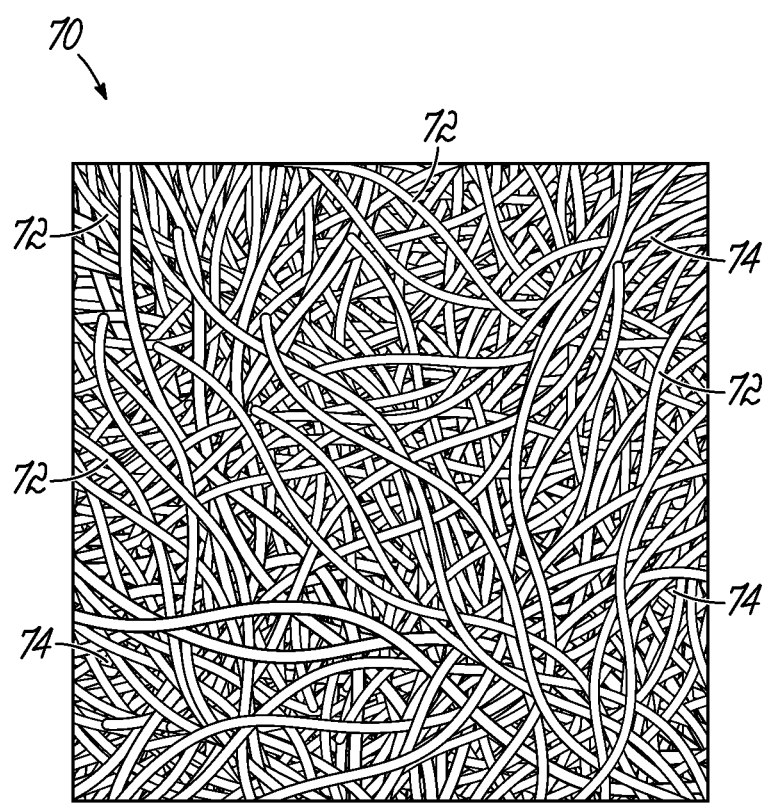
FIG. 6 is an enlarged view of a portion "6" of the filter shown in FIG. 5, illustrating characteristics of the non-woven panel of polyphenylene sulfide material.

Referring now to FIG. 6, an enlarged view of a portion 70 of the filter 12 is shown, illustrating characteristics of the non-woven panel of PPS material 58. More particularly, a number of the randomly oriented PPS micro-fibers 72 that form the non-woven panel of PPS material 58 are shown having interstitial openings 74 therebetween. The PPS micro-fibers 72 that make up the non-woven panel of PPS material 58 for use as the filter 12 have a size of approximately ½ to 3 denier. Preferably, a majority of the PPS micro-fibers 72 have a size of no more than 1 denier. The denier size of the PPS micro-fibers 72, the interstitial openings 74 therebetween, and the finish thickness or density of the non-woven panel of PPS material 58 are all characteristics that have an effect on the 0.5 micron particulate separation rating as well as separation efficiency of the filter 12. In this regard, while the particle retention size of 0.5 micron or less is engineered into the non-woven panel of PPS material 58, largely as a result of the denier of the PPS micro-fibers 72, the particle retention size is also a result of the density of the PPS micro-fibers 72 within each panel of PPS material 58. In that regard, a density of the panel of PPS material 58 can be varied by adjusting how much force is used to press-form the PPS micro-fibers 72 of each PPS panel 58 during the manufacturing process, as described above.

The millions of interstitial openings 74 between the PPS micro-fibers 72 create a built-in filter depth that forces the cooking oil 16 being drawn through the filter 12 to take a tortuous path as it moves through the filter 12. Along the path, particulate larger than 1 micron, and up to 60 micron or larger, for example, is held in suspension on top of the filter 12. Particulate smaller than 1 micron, such as 0.5 micron, is trapped in the interstitial openings 74 within the filter 12. In this regard, the orientation or entanglement of the PPS micro-fibers 72 and interstitial openings 74 therebetween define a porosity and permeability of the filter 12. The porosity of the filter 12 may be within a range of between 0.5 to 60 micron. The built-in filter depth described above improves porosity of the filter 12 and thereby reduces any blinding of the filter 12 by particulate and associated motor and pump 30 load as a result. The permeability of the filter 12, which is a measurement of fluid flow through the filter 12, typically measured in cubic feet per minute (cfm) at 0.5 inch water pressure, may be within a range of between 10 to 50 cfm of air per minute. Notably, the filter 12 is capable of maintaining these porosity and permeability ratings while filtering particulate from cooking oil 16 having a filtration temperature of up to 425° F. for extended periods of time. This is due to the fact that the interstitial openings 74 remain open and unaffected by the heat of the cooking oil 16 at full temperature (425° F.). To this end, a period of exposure time may be a few days to a few weeks, depending on oil temperature, the amount and type of fall off breading, and the amount of times the cooking oil 16 is cycled through the filter 12 and filter machine 10.

The filter 12 performs optimally in cooking oil at 375° F. for up to 30 days. After 30 days of use with the cooking oil being 375°, the flow rate through the filter 12 slows due to particulate deposits within the interstitial openings 74 of the filter 12. The same is true for filter 12a or any other filter described herein.

The filter 12 performs optimally in cooking oil at 425° F. for up to 4 hours. After 4 hours of use with the cooking oil being 425°, the interstitial openings 74 of the filter 12 begin to collapse due to the heat softening the PPS micro-fibers 72 which reduces the flow rate through the filter 12 to unacceptable levels. The same is true for filter 12a or any other filter described herein.

The filter 12 is reusable for a plurality of filtration cycles of the cooking oil 16 through the filter 12 and the filter machine 10 (a single filtration cycle may be defined as a single pass of the entirety of the cooking oil 16 contained in the fryer 18 through the filter 12). More particularly, the non-woven panel of PPS material 58 from which the filter 12 is formed may be reusable for up to one week or more. In this regard, as the cooking oil 16 is cycled through the filter 12, filtered particles accumulate on the surfaces of the filter 12 or among the interstitial openings 74 within the filter 12, as described above. This accumulation of filtered particulate forms what is known as a filter cake on the exposed surfaces of the filter 12. To reuse the filter 12, the surfaces of the filter 12, which are preferably glazed, may be cleaned by scraping the filter cake from the surfaces of the filter 12 with an appropriate tool. This will result in the removal of collected by-products of frying and other contaminates without impairing the integrity of the filter 12. The filter 12 must not be washed; however, when changing to new filter media, the separator screen 22 may be rinsed or washed for cleaning. The separator screen 22 may be dried before being reinserted into a new or existing filter 12, and the reassembled filter assembly 20 may be re-attached to the suction line 26 of the filter machine 10 for additional filtering of the cooking oil 16. The filter 12 is thus configured for re-use in a subsequent filtration cycle, or series of cycles, of the cooking oil 16. To this end, such cleaning cycles may be repeated until replacement of the filter 12 is deemed necessary.

The non-woven panel of PPS material 58 from which the filter 12 is formed is also wicking and absorbs and retains substantially less cooking oil 16 during each filtration cycle compared to conventional filters on the market. As a result, a majority of the oil 16 that passes through the filter 12 is pumped back to the fryer 18 rather than absorbed by the filter 12. Thus, substantially less oil 16 is discarded each time the filter 12 is removed for cleaning or replacement. Specifically, the envelope-shaped filter 12 retains less than 0.3 to 0.6 ounces of oil per square foot per day which is many times less than typical paper filters that absorb 4 to 8 ounces per square foot per day. In comparison, a flat sheet filter 12a of the type described in additional detail below absorbs approximately 25% less oil than the envelope style filter 12 after an entire week of filtration cycles of the cooking oil 16 by the filter machine 10. The non-absorbent nature of the non-woven panel of PPS material 58 also creates a dry filter cake that can be easily scraped from the filter 12 during daily cleaning.

Figure 7:
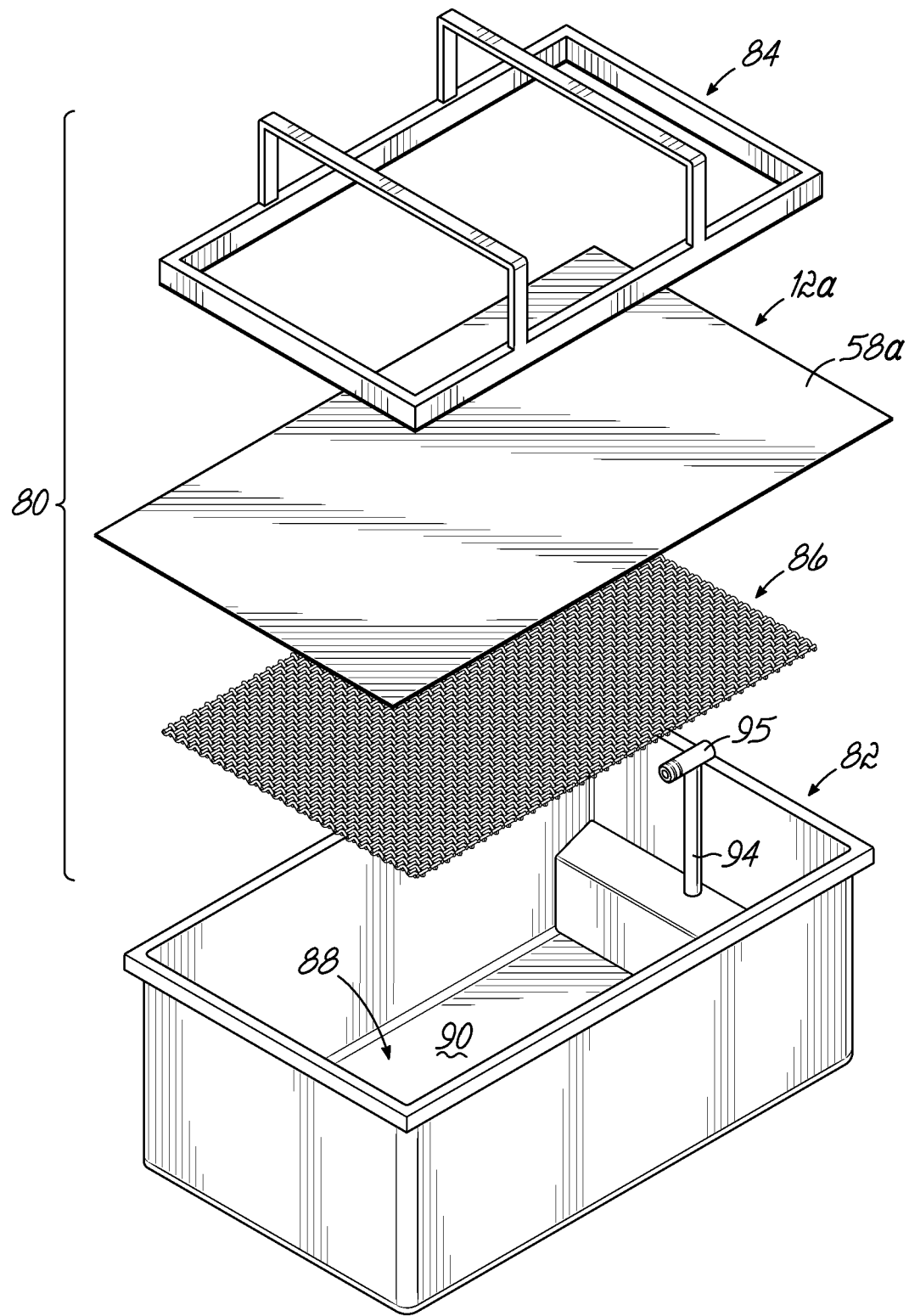
FIG. 7 is a disassembled perspective view of a filtering assembly having a flat sheet filter according to another embodiment of the invention.
Figure 8:
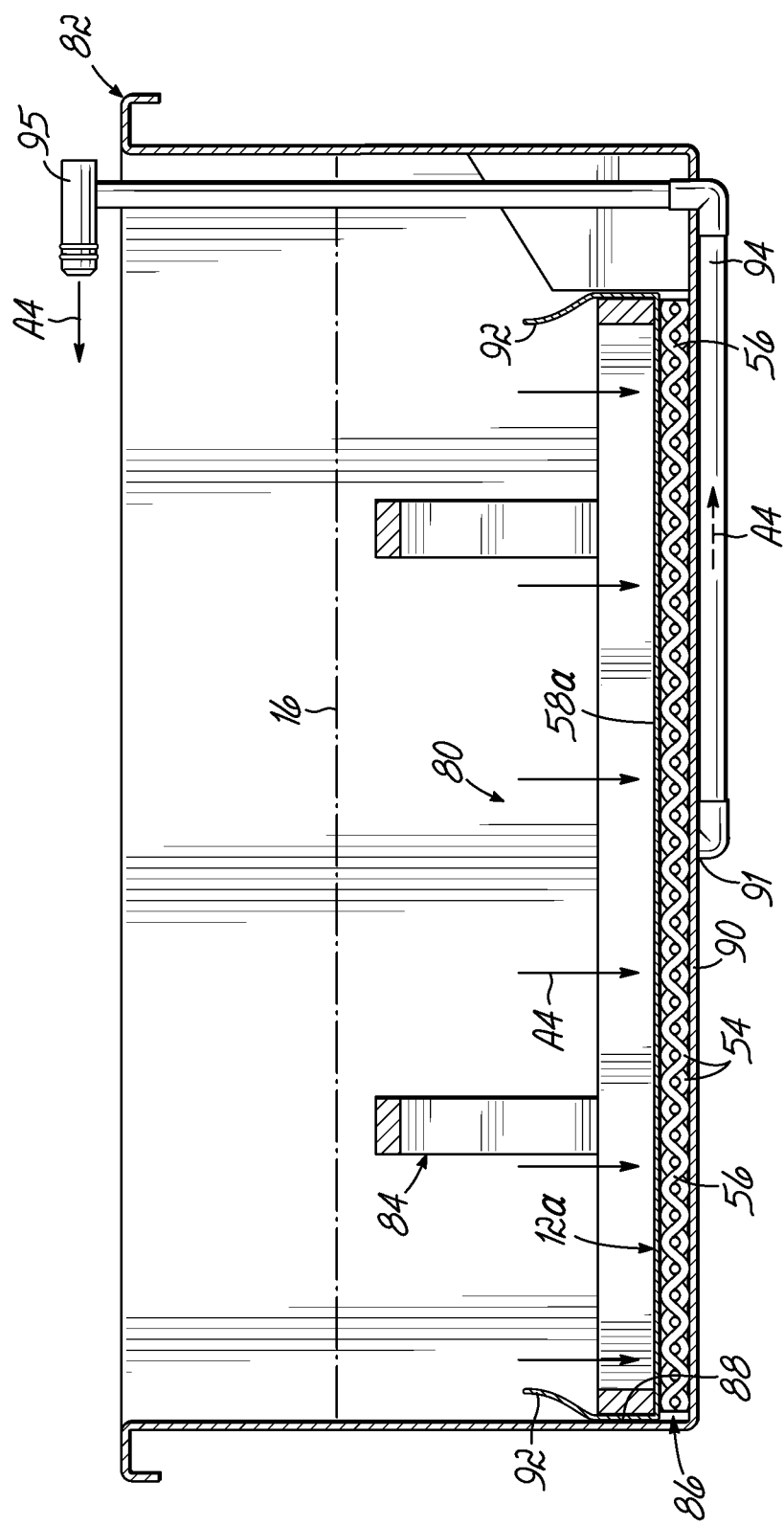
FIG. 8 is a cross-sectional view of the flat sheet filter assembly of FIG. 7, illustrating the filtering apparatus installed in a container for filtering particulate from edible cooking oil.

Referring now to FIGS. 7 and 8, wherein like numerals represent like features, an exemplary filter 12a is shown in accordance with another embodiment of the present invention. The primary differences between the filter 12a of this embodiment and the envelope-shaped filter 12 of the previously described embodiment is that the filter 12a is not envelope shaped but rather rectangular in shape. Rather, the filter 12a is formed from a single flat panel of non-woven PPS material 58a. The panel of non-woven PPS material 58a may have the same filtering characteristics and capabilities as the panel of non-woven PPS material 58 described above, except have a different shape and size, and absorbs 25% less oil than the aforementioned envelope-shaped filter 12. The filter 12a of this embodiment is configured for use with the filter machine 10 described above, and the principle of operation is essentially the same. However, to accommodate the filter 12a of this embodiment, a filter assembly 80 and a container 82 configured to receive the filter assembly 80 are required, both of which are configured for use with the filter machine 10 described above. In this regard, the container 82 is configured to be coupled to the filter machine 10 in place of the container 14 of the previous embodiment, as described in further detail below.

As shown, the filter assembly 80 includes a hold-down ring 84 and an underlayment screen 86, between which the filter 12a is sandwiched for installation to the container 82. Although one shape of hold-down ring 84 is illustrated, the hold-down ring or mechanism may be any desired size and shape. The underlayment screen 86 may have a construction similar to separator screen 22 described above with respect to the previous embodiment, having an array of interwoven tubular metal extrusions 54 with openings 56 therebetween.

With continued reference to FIGS. 7 and 8, the container 82 is configured to tightly receive the filter assembly 80 within a correspondingly sized space 88 adjacent a bottom wall 90 of the container 82 for filtering of the cooking oil 16. When so positioned, one side of the underlayment screen 86 is in contact with the bottom wall 90 of the container 82 while the filter 12a is held firmly against an opposite side of the underlayment screen 86 with the hold-down ring 84, which may be weighted, or include positive latching mechanisms. As shown in FIG. 8, edge portions 92 of the filter 12a may extend between the hold-down ring 84 and the container 82 to improve the seal between the underlayment screen 86 and the filter 12 for improved filtering operations, for example. Once the filter assembly 80 is installed to the container 82, as shown, the filter assembly 80 is ready for use, and the cooking oil 16 may be drained from the fryer 18 and into the container 82, as described above.

To filter particulate from the cooking oil 16, a vacuum tube 94 of the container 82 is configured to be connected to the suction line 26 of the filter machine 10 via a suction nipple 95 so that the pump 30 can apply a vacuum to vacuum tube 94 to draw the cooking oil 16 in the container 82 through the filter assembly 80 at the bottom of container 82 for filtering, as shown by directional arrows A4. More particularly, the cooking oil 16 is drawn through the filter 12a and the underlayment screen 86. The filtered cooking oil 16 is then passed through a drain 91 in the bottom wall 90 of container 82 and pumped out of the container 82 via the vacuum tube 94 and recirculated to the fryer 18 via the suction line 26 and a return line 36 as described above with respect to the previous embodiment of the filter machine 10. This process may be repeated, if desired, for multiple filtration cycles of the cooking oil 16, although good results may be usually obtained in a single pass through the filter 12a.

Although one type of container 82 is illustrated, other containers may be used. For example, the vacuum tube 94 of the container 82 may be in a different location. If the vacuum tube 94 of the container 82 is in the center of the container 82, the underlayment screen 86 may have a threaded port (not shown) like threaded port 24 to which the vacuum tube 94 of the container 82 would be attached. In such a container, the flat or planar filter 12a would have an opening (not shown) through which the vacuum tube 94 of the container would pass.

In another embodiment, the filter 12a may be located in-line of the plumbing to or from the fryer, or even within a fry pot of the fryer, so as to be immersed in the cooking oil contained therein. In this embodiment, the filter 12a would be in constant communication with cooking oil at a temperature of between 300° F. to 375° F., and up to 425° F., during operation of the fryer. The oil may be continuously or intermittently circulated through the filter 12a to filter particulate from the cooking oil as desired. To this end, the filter 12a of this embodiment may be part of a portable or fixed oil filtration circuit configured to draw oil through the filter 12a for particulate removal.

While the various principles of the invention have been illustrated by way of describing various exemplary embodiments, and while such embodiments have been described in considerable detail, there is no intention to restrict, or in any way limit, the scope of the appended claims to such detail. Additional advantages and modifications will readily appear to those skilled in the art. Further, various changes could be made in the above-described aspects and exemplary embodiments without departing from the scope of the invention, and it is intended that all matter contained in the above description shall be interpreted as illustrative and not in a limiting sense.

What is claimed is:

1. A method of filtering edible cooking oil at a filtration temperature of up to 425° Fahrenheit, the method comprising:
    providing an envelope-shaped filter comprising at least one non-woven panel of randomly oriented fibers of polyphenylene sulfide material;
    inserting a separator screen into a pocket of the envelope-shaped filter, the separator screen having a threaded port configured to couple with a cooking oil suction line of a filter machine; and
    exposing the filter to the cooking oil at a temperature of up to 425° Fahrenheit while applying a pressure or vacuum to move the cooking oil through the filter for filtering particulate from the cooking oil to filter particles 0.5 microns and larger for up to four hours without cleaning or changing the filter.

2. The method of claim 1, wherein the filter includes interstitial openings between the fibers which define a porosity of the filter, the porosity of the filter being in a range of between 0.5 to 60 micron.

3. The method of claim 1, wherein the filter has a permeability within a range of between 20 to 40 cubic feet of air per minute at 0.5 inch water pressure.

4. The method of claim 1, wherein the filter has a density within a range of between 5 to 24 ounces per square yard of surface area.

5. The method of claim 1, wherein during the step of exposing the filter to the cooking oil at a frying temperature for a period of time, the filter experiences a shrinkage in a weft and a warp dimension of no more than 1.5%.

6. The method of claim 1, wherein the filter is non-absorbent such that during the step of exposing the filter to the cooking oil for a period of time, the filter retains between 0.3 to 0.6 ounces of oil per square foot of the filter.

7. A method of filtering edible cooking oil in a container at a filtration temperature of up to 375° Fahrenheit, the method comprising:
    providing an envelope-shaped filter comprising at least one non-woven panel of randomly oriented fibers of polyphenylene sulfide material;
    inserting a separator screen into a pocket of the envelope-shaped filter to create a filter assembly, the separator screen configured to support the filter in an expanded state to expose as much surface area of the filter as possible to the cooking oil, the separator screen having a threaded port configured to couple with a cooking oil suction line of a filter machine, wherein engagement between the threaded port of the separator screen and the cooking oil suction line maintains positioning of the filter assembly in the container, the threaded port of the separator screen extending through a centrally located aperture formed in the filter; and exposing the filter to the cooking oil at a temperature of up to 375° Fahrenheit for up to 30 days while applying a pressure or vacuum to move the cooking oil through the filter for filtering particulate from the cooking oil for up to eight hours per day to filter particulates 0.5 microns and larger, without needing to clean or change the filter.

8. The method of claim 7, wherein the filter includes interstitial openings between the fibers which define a porosity of the filter, the porosity of the filter being in a range of between 0.5 to 60 micron.

9. The method of claim 7, wherein the filter has a permeability within a range of between 20 to 40 cubic feet of air per minute at 0.5 inch water pressure.

10. The method of claim 7, wherein the filter has a density within a range of between 5 to 24 ounces per square yard of surface area.

11. The method of claim 7, wherein during the step of exposing the filter to the cooking oil at a frying temperature for a period of time, the filter experiences a shrinkage in a weft and a warp dimension of no more than 1.5%.

12. The method of claim 7, wherein the filter is non-absorbent such that during the step of exposing the filter to the cooking oil for a period of time, the filter retains between 0.3 to 0.6 ounces of oil per square foot of the filter.

13. A method of filtering edible cooking oil in a container at a filtration temperature of up to 375° Fahrenheit, the method comprising:

providing an envelope-shaped filter formed from a single non-woven panel of randomly oriented fibers of polyphenylene sulfide material folded along fold lines to form the envelope-shaped filter;

inserting a separator screen into a pocket of the envelope-shaped filter to create a filter assembly, the separator screen configured to support the filter in an expanded state to expose as much surface area of the filter as possible to the cooking oil, the separator screen having a threaded port configured to couple with a cooking oil suction line of a filter machine, wherein engagement between the threaded port of the separator screen and the cooking oil suction line maintains positioning of the filter assembly in the container, the threaded port of the separator screen extending through a centrally located aperture formed in the filter; and exposing the filter to the cooking oil at a temperature of up to 375° Fahrenheit for up to two hundred and forty hours while applying a pressure or vacuum to move the cooking oil through the filter for filtering particulate 0.5 microns and larger from the cooking oil without needing to clean or change the filter.

* * * * *